(12) United States Patent
Wang et al.

(10) Patent No.: US 10,256,682 B2
(45) Date of Patent: Apr. 9, 2019

(54) STATOR ASSEMBLIES FOR THREE PHASE DYNAMOELECTRIC MACHINES AND RELATED WINDING METHODS

(71) Applicant: Emerson Electric Co., St. Louis, MO (US)

(72) Inventors: Weirong Wang, Chesterfield, MO (US); Yongyue Yin, Suzhou (CN); Jiangang Wu, Suzhou (CN); Jun Yu, Suzhou (CN)

(73) Assignee: Emerson Electric Co., St. Louis, MO (US)

( * ) Notice: Subject to any disclaimer, the term of this patent is extended or adjusted under 35 U.S.C. 154(b) by 269 days.

(21) Appl. No.: 15/278,599

(22) Filed: Sep. 28, 2016

(65) Prior Publication Data

US 2018/0091006 A1    Mar. 29, 2018

(51) Int. Cl.
*H02K 1/16* (2006.01)
*H02K 3/12* (2006.01)
*H02K 3/28* (2006.01)
*H02K 15/085* (2006.01)
*H02K 15/095* (2006.01)
*H02K 3/52* (2006.01)
*H02K 7/14* (2006.01)

(52) U.S. Cl.
CPC ............. *H02K 1/165* (2013.01); *H02K 3/12* (2013.01); *H02K 3/28* (2013.01); *H02K 15/085* (2013.01); *H02K 15/095* (2013.01); *H02K 3/522* (2013.01); *H02K 7/14* (2013.01)

(58) Field of Classification Search
CPC ............. H02K 1/165; H02K 3/12; H02K 3/28

USPC ............................................................ 310/179
See application file for complete search history.

(56) References Cited

U.S. PATENT DOCUMENTS

| | | | | |
|---|---|---|---|---|
| 3,822,830 A | * | 7/1974 | Peters | H02K 15/085 |
| | | | | 242/432.5 |
| 3,854,077 A | * | 12/1974 | Greenwell | H02P 23/28 |
| | | | | 318/808 |
| 3,978,564 A | * | 9/1976 | Soler Font | H02K 15/095 |
| | | | | 29/33 F |
| 5,057,731 A | * | 10/1991 | Hancock | G11B 19/2009 |
| | | | | 310/180 |
| 6,008,561 A | * | 12/1999 | Tang | H02K 19/103 |
| | | | | 310/180 |

(Continued)

*Primary Examiner* — Robert W Horn
(74) *Attorney, Agent, or Firm* — Harness, Dickey & Pierce, P.L.C.

(57) ABSTRACT

According to some aspects of the present disclosure, example stator assemblies for three phase dynamoelectric machines and related winding methods are disclosed. An example stator assembly generally includes a non-segmented stator core including a stator yoke and a plurality of teeth. The stator assembly also includes a plurality of coil portions electrically coupled in a delta winding pattern, with each coil portion extending around a different one of the plurality of teeth. The stator assembly further includes a plurality of connection portions each extending between two adjacent ones of the plurality of coil portions. A first set of consecutive ones of the plurality of coil portions is defined by a first continuous length of winding wire having two wire ends. Second and third sets of consecutive ones of the plurality of coil portions are each defined by respective continuous lengths of winding wire each having two ends.

22 Claims, 4 Drawing Sheets

(56) References Cited

U.S. PATENT DOCUMENTS

| | | | | |
|---|---|---|---|---|
| 6,285,104 B1* | 9/2001 | Nashiki | H02K 1/165 | 310/184 |
| 6,351,050 B1* | 2/2002 | Coles | B62D 5/0403 | 180/443 |
| 6,759,780 B2* | 7/2004 | Liu | H02K 3/28 | 29/596 |
| 6,924,570 B2* | 8/2005 | De Filippis | H02K 3/522 | 310/260 |
| 7,247,962 B2* | 7/2007 | Burgbacher | H02K 3/522 | 310/184 |
| 7,723,878 B2* | 5/2010 | Yagai | H02K 3/522 | 310/71 |
| 9,318,990 B2* | 4/2016 | Frank | H02P 25/22 | |
| 10,103,596 B2* | 10/2018 | Wang | H02K 3/522 | |
| 2008/0116755 A1* | 5/2008 | Sahara | H02K 3/522 | 310/71 |
| 2011/0095639 A1* | 4/2011 | Nakamura | H02K 3/28 | 310/207 |
| 2011/0127875 A1* | 6/2011 | Pulnikov | H02K 3/493 | 310/195 |
| 2014/0028130 A1* | 1/2014 | Sonoda | H02K 3/28 | 310/71 |
| 2014/0127056 A1* | 5/2014 | Wang | H02K 3/28 | 417/410.5 |
| 2014/0339936 A1* | 11/2014 | Sahara | H02K 3/28 | 310/71 |
| 2015/0130322 A1* | 5/2015 | Hazeyama | H02K 1/146 | 310/215 |
| 2017/0018985 A1* | 1/2017 | Suzuki | H02K 3/34 | |
| 2017/0040857 A1* | 2/2017 | Bitzer | H02K 3/28 | |
| 2017/0366115 A1* | 12/2017 | Akutsu | H02P 27/06 | |
| 2018/0034331 A1* | 2/2018 | Csoti | H02K 3/28 | |
| 2018/0091006 A1* | 3/2018 | Wang | H02K 1/165 | |
| 2018/0152083 A1* | 5/2018 | Schmid | H02K 3/522 | |
| 2018/0166932 A1* | 6/2018 | Desai | H02K 1/148 | |

\* cited by examiner

STATOR ASSEMBLIES FOR THREE PHASE DYNAMOELECTRIC MACHINES AND RELATED WINDING METHODS

FIELD

The present disclosure relates to stator assemblies for three phase dynamoelectric machines and related winding methods.

BACKGROUND

This section provides background information related to the present disclosure which is not necessarily prior art.

Stator assemblies for three phase dynamoelectric machines commonly include a stator core having a yoke and multiple teeth extending from the yoke toward a central opening. Typically, a winding wire is wound around a tooth to form a coil having two wire ends. This is repeated for each of the multiple teeth to form multiple coils each having their own wire ends. The different wire ends are then routed and bundled in groups for connecting to a power source. The power source may have different phases requiring the different wire ends to be connected to the proper phase.

SUMMARY

This section provides a general summary of the disclosure, and is not a comprehensive disclosure of its full scope or all of its features.

According to one aspect of the present disclosure, a stator assembly for a three phase dynamoelectric machine generally includes a non-segmented stator core including a stator yoke and a plurality of teeth extending from the stator yoke toward a central opening. The central opening extends from a first end of the stator core to a second end of the stator core opposite the first end. The plurality of teeth are spaced apart from one another and define a plurality of slots between the plurality of teeth for receiving windings of the stator assembly. The stator assembly includes a plurality of coil portions electrically coupled in a delta winding pattern, with each coil portion extending around a different one of the plurality of teeth and through slots on each side of said different one of the plurality of teeth. The stator assembly also includes a plurality of connection portions, with each connection portion extending between two adjacent ones of the plurality of coil portions and electrically coupling said two adjacent ones of the plurality of coil portions. A first set of consecutive ones of the plurality of coil portions and the connection portions coupled therebetween are defined by a first continuous length of winding wire having two wire ends, a second set of consecutive ones of the plurality of coil portions and the connection portions coupled therebetween are defined by a second continuous length of winding wire having two wire ends, and a third set of consecutive ones of the plurality of coil portions and the connection portions coupled therebetween are defined by a third continuous length of winding wire having two wire ends.

According to another aspect of the present disclosure a method of winding a stator assembly for a three phase dynamoelectric machine is disclosed. The stator assembly includes a non-segmented stator core having a stator yoke and a plurality of teeth extending from the stator yoke toward a central opening. The central opening extends from a first end of the stator core to a second end of the stator core opposite the first end, and the plurality of teeth are spaced apart from one another and defining a plurality of slots between the plurality of teeth for receiving windings of the stator assembly. The method includes winding a wire around three consecutive ones of the plurality of teeth to define a first coil portion about a first of the three consecutive ones of the plurality of teeth, to define a second coil portion about a second of the three consecutive ones of the plurality of teeth, to define a third coil portion about a third of the three consecutive ones of the plurality of teeth, to define a first connection portion extending between the first coil portion and the second coil portion to electrically couple the first coil portion and the second coil portion, and to define a second connection portion extending between the second coil portion and the third coil portion to electrically couple the second coil portion and the third coil portion. The first coil portion, the second coil portion, the third coil portion, the first connection portion, and the second connection portion are defined by a continuous length of wire having two wire ends.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
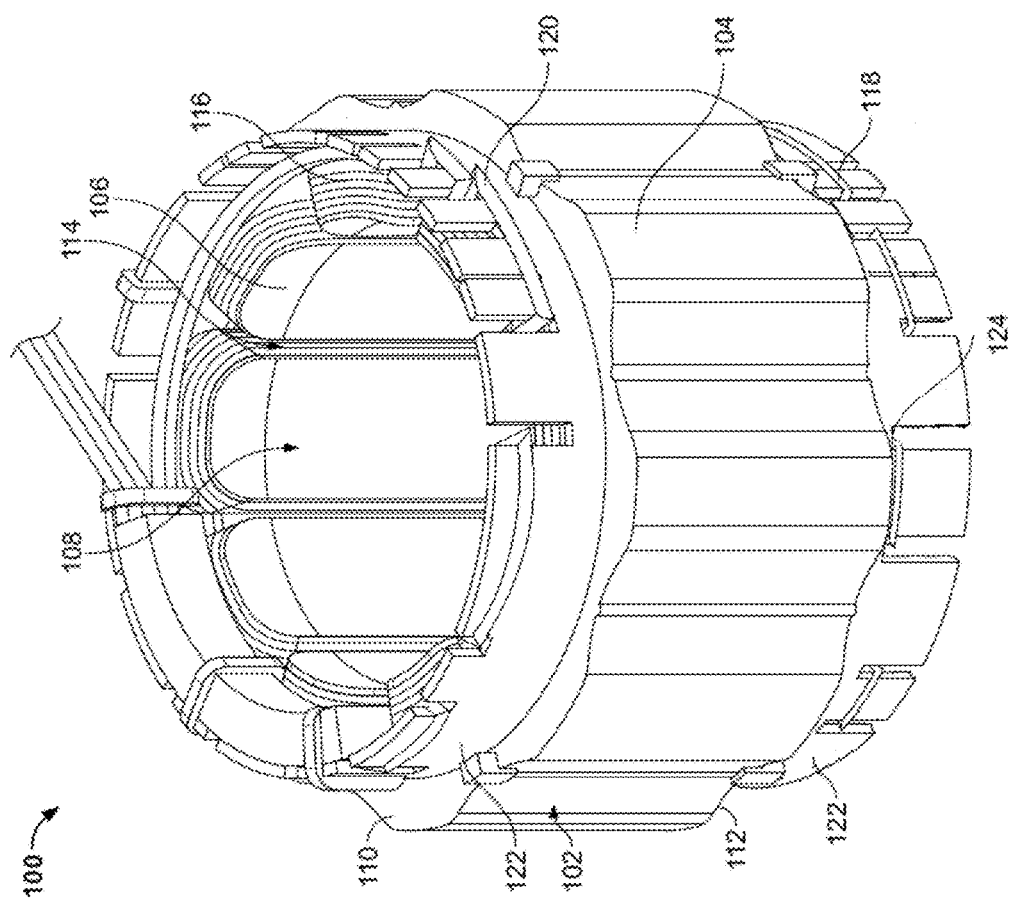
FIG. 1 is a perspective view of an example stator assembly according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A stator assembly for a three phase dynamoelectric machine according to one example embodiment of the present disclosure is illustrated in FIG. 1, and indicated generally by the reference number 100. As shown in FIG. 1, the stator assembly 100 includes a non-segmented stator core 102 including a stator yoke 104 and a plurality of teeth 106 extending from the stator yoke toward a central opening 108. The central opening 108 extends from one end 110 of the stator core 102 to another end 112 of the stator core. For example, the central opening 108 may extend from a lead end 110 of the stator core 102 to an opposite lead end 112 of the stator core. The plurality of teeth 106 are spaced apart from one another and define a plurality of slots 114 between the plurality of teeth for receiving windings of the stator assembly 100.

The stator assembly 100 also includes a plurality of coil portions 116 each extending around one of the plurality of teeth 106 and through slots 114 on each side of the tooth. The stator assembly 100 further includes a plurality of connection portions 118 each extending between two different coil portions 116 to electrically couple the two coil portions.

A first set of consecutive ones of the plurality of coil portions 116 and the connection portions 118 coupled therebetween are defined by a first continuous length of winding wire having two wire ends. For example, a continuous length of wire may be wound about a first tooth 106, routed from the first tooth over to a second tooth adjacent the first tooth, and wound about the second tooth. The continuous length of wire may further be routed from the second tooth 106 over to a third tooth adjacent the second tooth, and wound about the third tooth. Accordingly, a single continuous length of winding wire may define a first coil portion 116 about the first tooth 106, a connection portion 118 from the first tooth to the second tooth, a second coil portion about the second tooth, another connection portion from the second tooth to the third tooth, and a third coil portion about the third tooth, such that the winding wire defining the three coil portions and the two connection portions does not have any breaks, cuts, interruptions, multiple segments, etc. Each end of the continuous length of wire defines a wire end.

The first tooth 106, second tooth and third tooth are consecutive, such that the three teeth are adjacent one another, in a row going around the stator without any other teeth intervening between the three consecutive teeth, etc. Accordingly, the continuous length of wire defines coil portions 116 and connection portions 118 about three consecutive teeth 106 of the stator assembly 100.

The stator assembly also includes a second set of consecutive coil portions 116 and the connection portions 118 coupled therebetween that are defined by a second continuous length of winding wire having two wire ends. For example, another continuous length of wire may be wound about a second set of consecutive teeth 106 of the stator assembly 100. The continuous length of wire may be would about a first tooth 106 belonging to the second set of consecutive teeth, routed from the first tooth over to a second tooth adjacent the first tooth in the second set of consecutive teeth, and wound about the second tooth. The continuous length of wire may further be routed from the second tooth 106 over to a third tooth adjacent the second tooth in the second set of consecutive teeth, and wound about the third tooth. Accordingly, a single continuous length of winding wire may define coil portions 116 about each tooth 106 in the second set of consecutive teeth, and connection portions 118 therebetween, such that the winding wire defining the three coil portions and the two connection portions of the second set of consecutive teeth does not have any breaks, cuts, interruptions, multiple segments, etc.

The second set of consecutive teeth can be separate from the first set of consecutive teeth, such that each set of consecutive teeth includes different ones of the plurality of teeth 106 of the stator assembly 100. For example, if the stator assembly 100 includes nine teeth 106, teeth 1 through 3 may belong to the first consecutive set and teeth 4 through 6 may belong to the second consecutive set. In this example, consecutive teeth 1 through 3 would include coil portions 116 defined by a single continuous length of wire, and consecutive teeth 4 through 6 would include coil portions defined by another single continuous length of wire.

The stator assembly 100 may also include a third set of consecutive teeth having coil portions 116 and connections portions 118 therebetween defined by another single continuous length of wire. Continuing with the above example, consecutive teeth 7 through 9 may belong to the third consecutive set such that coil portions 116 of teeth 7 through 9 are defined by a single continuous length of wire.

Accordingly, the stator assembly 100 may include multiple different sets of consecutive teeth having coil portions 116 and connection portions 118 therebetween defined by different single continuous lengths of wire. Wiring coil portions 116 and connection portions 118 of consecutive teeth using a single continuous length of wire can allow for a winding machine to provide faster wiring of the stator assembly, can reduce the complexity of user bundling of lead portions after wiring is finished, etc. Having multiple sets of consecutive teeth can allow for a winding machine to wire the multiple sets substantially simultaneously (e.g., at the same time) to further reduce the winding time of the stator assembly 100.

Although the example embodiment of FIG. 1 is described herein as having nine teeth grouped into three sets of three consecutive teeth each, it should be apparent that other embodiments may include more or less teeth, more or less sets of consecutive teeth, more or less teeth in each set, etc.

The three phase dynamoelectric machine may be any suitable dynamoelectric machine, including a motor, a generator, etc. The dynamoelectric machine may include at least three terminals, which may form first, second and third pairs of terminals for coupling to first, second and third phases of a three phase electric power source. In some embodiments, the dynamoelectric machine may include a nine slot, six pole, concentric wound, brushless permanent magnet (BPM) motor. As should be apparent, other embodiments may include other suitable dynamoelectric machines.

The multiple coil portions 116 of the stator assembly 100 may include a first set of coil portions corresponding to a first phase of the dynamoelectric machine, a second set of coil portions corresponding to a second phase of the dynamoelectric machine and a third set of coil portions corresponding to a third phase of the dynamoelectric machine for coupling to a first phase, a second phase, and a third phase, respectively, of a three phase electric power source. Each phase may include coil portion(s) coupled between a different pair of terminals of the dynamoelectric machine. For example, the coil portions 116 belonging to the first set of coil portions may be coupled between a first pair of terminals of the dynamoelectric machine. The first pair of terminals may be configured for coupling to a first phase of a three phase electric power source, via any suitable coupling element(s), including lead portions, lead wire bundles, terminal connectors, etc. The second set of coil portions 116 may be coupled between a second pair of terminals of the dynamo electric machine (which may include one terminal of the first pair of terminals), and the second pair of terminals may be configured for coupling to a second phase of the three phase electric power source. Similarly, the third set of coil portions may be coupled between a third pair of terminals (which may include one terminal from the first pair and one terminal from the second pair), and the third pair of terminals may be configured for coupling to a third phase of the three phase electric power source. Accordingly, the first set of coil portions 116 may all be energized with the same power phase, the second set of coil portions may all be energized with a same power phase that is different from the first set of coil portions, and the third set of coil portions may all be energized with a same power phase that is different from the first set of coil portions and the second set of coil portions.

The stator assembly 100 may include a total of nine teeth 106 and a total of nine coil portions 116. Each of the nine coil portions 116 may be wound about a different one of the nine teeth and through slots 114 on each side of said different one of the nine teeth. Other embodiments may include more or less teeth 106 and more or less coil portions 116 (e.g., six teeth and six coil portions, twelve teeth and twelve coil portions, etc.). The number of coil portions 116 may or may not correspond to the number of teeth 106 of the stator assembly 100, and each tooth 106 may include no coil portion, a single coil portion, more than one coil portion, etc.

Figure 2:
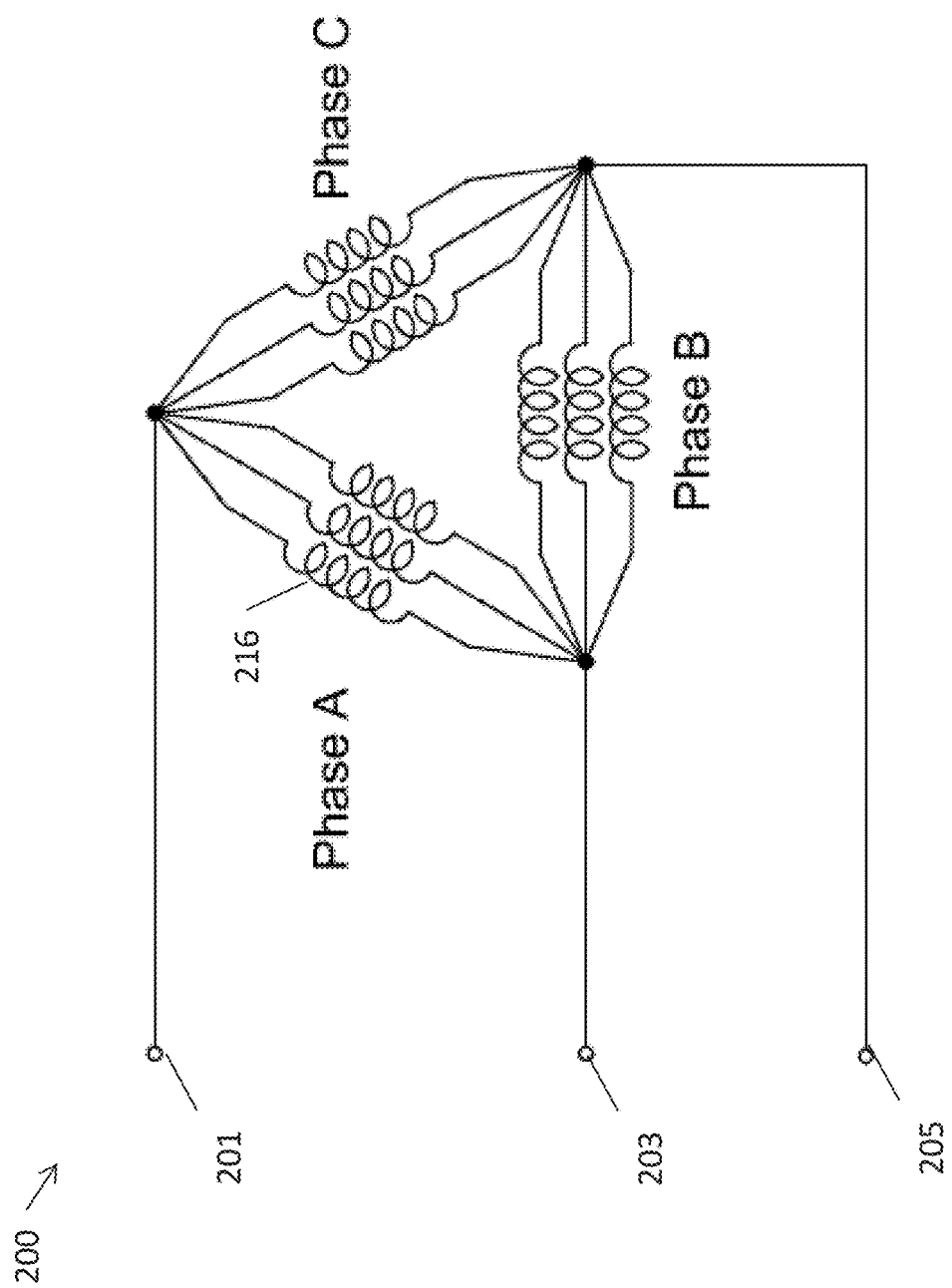
FIG. 2 is a diagram of an example delta winding connection pattern for a stator assembly.

The coil portions 116 may be electrically coupled in a delta winding pattern. An example delta winding pattern diagram 200 is shown in FIG. 2. The delta winding pattern 200 includes three different phase connection wires (201, 203, 205) for connecting to different phases of a three phase electric power source (not shown). Each coil portion 216 belongs to one of three different sets of coil portions (Phase A, Phase B, Phase C) and is coupled to a respective phases of the three phase electric power source via the phase connection wires 201, 203, 205.

Referring back to FIG. 1, adjacent coil portions 116 may belong to different ones of the sets of coil portions described above. For example, a coil portion 116 belonging to the first set of coil portions that is configured for coupling to a first phase of the three phase electric power source may be adjacent a coil portion belonging to the second set of coil portions on one side, and also adjacent a coil portion belonging to the third set of coil portions on the other side. The coil portions 116 may alternate to provide an even distribution of each set of coils around the stator assembly 100. For example, the coil portions may be ordered sequentially around the stator core 102 (e.g., in an order of a first phase coil portion, then a second phase coil portion, then a third phase coil portion, then starting over at a first phase coil portion, etc.).

Each consecutive set of teeth may include coil portions 116 corresponding to each of the three phases of the three phase dynamoelectric machine. For example, a consecutive set of teeth may include a first coil potion 116 corresponding to a first phase of the three phase dynamoelectric machine, a second coil portion corresponding to a second phase of the three phase dynamoelectric machine, and a third coil portion corresponding to a third phase of the three phase dynamoelectric machine. Accordingly, a continuous length of winding wire may form coil portions 116 corresponding to each phase of the three phase dynamoelectric machine.

Each connection portion 118 may extend between two coil portions 116 and electrically couple the two coil portions. For example, the connection portion 118 may include a length of winding wire connecting two coil portions. The connection portion 118 may be continuous, may be cut into one or more segments, etc. The connection portion 118 may be an intermediate portion of a continuous length of wire defining two coil portions 116 and the connection portion 118.

The connection portion 118 may include one or more lead portions 120. For example, the connection portion 118 may include a portion of winding wire that can be coupled to a phase connection wire of a three phase electric power source. The lead portion 120 may be a part of the connection portion 118 that extends out from the stator core 102 (e.g., via a bend in the winding wire, etc.) to be connected to a power source. Accordingly, a continuous length of wire may define a first coil portion 116, a connection portion 118 including a lead portion 120, and a second coil portion.

Each lead portion 120 of the plurality of connection portions 118 may be positioned in one of a first, second or third lead bundle for coupling to a first phase, a second phase, or a third phase, respectively, of a three phase electric power source. For example, the stator assembly 100 may include multiple lead portions 120 (e.g., six lead portions, nine lead portions, twelve lead portions, etc.). The multiple lead portions 120 may be positioned in bundles with other lead portions that are configured to connect to the same phase of a three phase electric power source. Once the lead portions 120 are bundled, each bundle can be coupled to its respective phase of the three phase power source.

The lead portions 120 of the stator assembly 100 may be routed through the slots 114 of the stator assembly. For example, lead portions 120 may be routed through nine slots 114 of the stator assembly. In some embodiments, lead portions may be routed through all slots 114 of the stator assembly 100.

The stator assembly 100 may include an end cap 122 positioned on an end of the stator core 102. The end cap 122 may be positioned at a lead end 110 of the stator core 102, an opposite lead end of the stator core 102, etc.

The end cap 122 includes a plurality of guides 124 for separating connection portions 118 corresponding to different phases to prevent shorting between the connection portions corresponding to the different phases. The guides 124 may be any suitable elements for separating the connection portions 118, including notches, cutouts, etc.

The guides 124 may position the connection portions 118 at different locations along a wall of the end cap 122. The connection portions 118 can be positioned at different locations based on a depth of the notch, a height of the notch, etc. Accordingly, the connection portions 118 corresponding to different phases may not contact each other, overlap each other, etc. and therefore may not short one another as the connection portions are routed between different coil portions 116.

The end cap 122 can be made out of any suitable material(s), including plastic, etc. The end cap 122 may be non-conductive to prevent shorting of different connection portions 118.

The stator assembly 100 may include two end caps 122, which may be positioned at opposite ends of the stator core 102. For example, one end cap may be positioned at a lead end of the stator core 102, while a second end cap is positioned at an opposite lead end of the stator core 102. The end cap at the opposite lead end of the stator core 102 may be used to route the connection portions 118 of the winding wire as the wire is routed from one coil portion to another coil portion. The end cap 122 at the lead end of the stator core 102 may be configured to route at least some of the lead portions 120 into lead bundles, guide routing of the lead portions as they are grouped into lead bundles, guide the lead portions out of the stator core for connection to a three phase electric power source, etc.

The end caps 122 may be designed such that an end cap at the opposite lead end includes features corresponding to routing of the connection portions 118 at an opposite lead end of the stator core 102. The end cap 122 at the lead end may include features corresponding to routing of the lead portions 120 at the lead end of the stator core.

The stator assembly 100 may include one or more continuous lengths of winding wire. For example, all coil portions 116 and connection portions 118 may be defined by one continuous length of winding wire. One continuous length of winding wire may be wound about all of the teeth 106 of the stator assembly 100.

Figure 3:
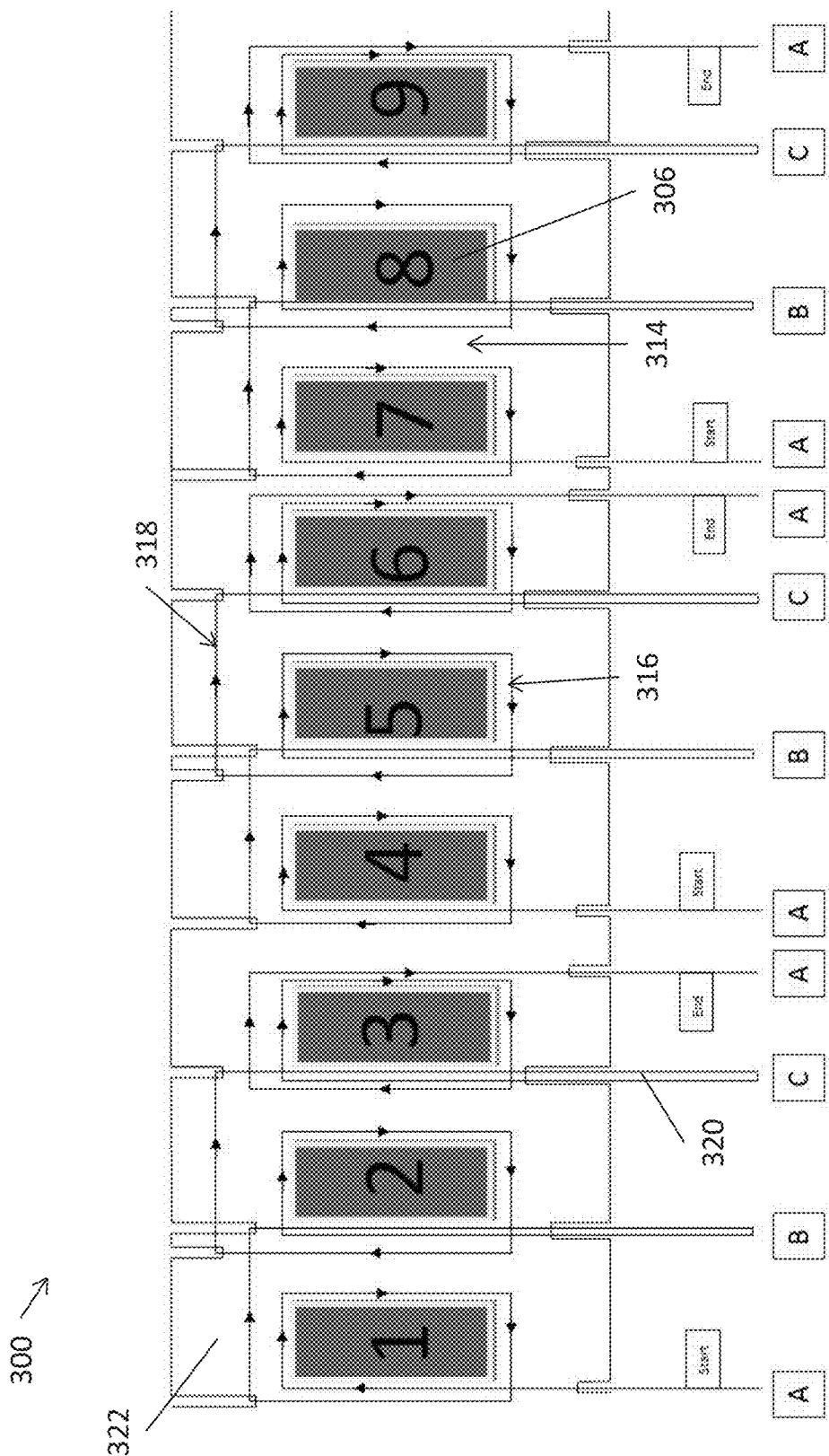
FIG. 3 is a diagram of an example winding pattern for a stator assembly according to one example embodiment of the present disclosure.

FIG. 3 illustrates a winding pattern 300 for a stator assembly, which may be similar to the stator assembly 100 of FIG. 1. The winding pattern 300 includes three separate continuous lengths of wire wound about all nine teeth 306 of the stator assembly. The arrows of the length of wire indicate a direction of winding of the wire, from a start point of the wire to an end point of the wire.

The winding pattern 300 includes coil portions 316 about each tooth 306 of the stator assembly. Although the winding pattern 300 illustrates only one turn about each tooth 306, any suitable number of turns (e.g., 70 turns, 80 turns, etc.) may be used.

The winding pattern 300 includes connection portions 318 between coil portions 316. The connection portions 318 are separated into layers according to which phase the connection portion corresponds to. For example, connection portions 318 that include lead portions 320 coupled to phase B of a three phase electric power source are positioned on the bottom layer of connection portions closest to the end of the stator core, while connection portions that include lead portions coupled to phase C of the three phase electric power source are positioned in the top layer of connection portions furthers from an end of the stator core.

Although the connection portion 318 cross over one another at some locations in the winding pattern 300, connection portions 318 connecting to different phases of a three phase electric power source may be separated from contacting one another by the end cap 322. For example, when connection portions 318 from different layers are shown as overlapping in winding pattern 300, the end cap 122 may instead route the connection portions 318 on different sides of the end cap at those points.

Each connection portion 318 also includes a lead portion 320 which extends out from one of the slots 314 between the teeth 306. For example, each connection portion 318 begins from one coil portion 316 about a first tooth 306, defines a lead portion which extends through one of the slots 314, and then extends to another tooth to form another coil portion.

The lead portions 120 may be bundled together to form lead bundles (not shown). These lead bundles may include only lead portions 320 corresponding to the same phase of a three phase electric power source. For example, lead portions 320 corresponding to phase A may be bundled together, lead portions corresponding to phase B may be bundled together, and lead portions corresponding to phase C may be bundled together. Once bundled, the lead bundles can be connected to the power source at their respective phase terminals.

In some embodiments, the winding wire may be wound through the teeth in a winding pattern to increase slot fill in the slots 314. The winding wire may be wound to maximize the slot fill.

The example stator assembly 100 of FIG. 1 may include winding pattern 300 described herein, or may include any other suitable winding pattern, and the winding patterns described herein may be implemented in the example stator assemblies described herein or any other suitable stator assemblies.

The stator core 102 may be any suitable stator core having any suitable size and shape. In some embodiments, the stator may have a frame size of 63. The stator assembly 100 may be used in any suitable implementation, including variable speed motors, fixed speed motors, etc.

The coil portions may be any suitable coils wound about the teeth 106 of the stator core 102. In some embodiments, the coil potions 116 may each include the same number of turns. The coil portions 116 may include any suitable number of turns, including but not limited to 52 turns, 63 turns, 68 turns, 85 turns, 96, turns, 97 turns, 104 turns, 137 turns, 162 turns, etc. As should be apparent, other embodiments may include more or less turns per coil portion, different coil portions that include different numbers of turns, etc.

The winding wire may include any suitable wire, which may comprise any suitable conductor material(s). For example, the winding wire may include copper, aluminum, a compound alloy, etc.

The winding wire may be any suitable size, including but not limited to 15.5 AWG, 16.50 AWG, 17.50 AWG, 18

AWG, 18.5 AWG, 19.25 AWG, 20 AWG, etc. As should be apparent, other embodiments may include winding wire having a different wire gauge.

The end cap 122 may allow for the winding wire to not include any sleeve covering any connection portions of the winding wire. For example, the guides 124 of the end cap 122 may separate connection portions 118 corresponding to different phases of a three phase electric power source, such that no sleeve is needed to cover the connection portions as they are routed between coil portions. Although a sleeve is not required, one or more sleeves can still be used if desired. For example, one or more sleeves may be used for lead portion bundles to prevent shorting between lead portions 120.

Figure 4:
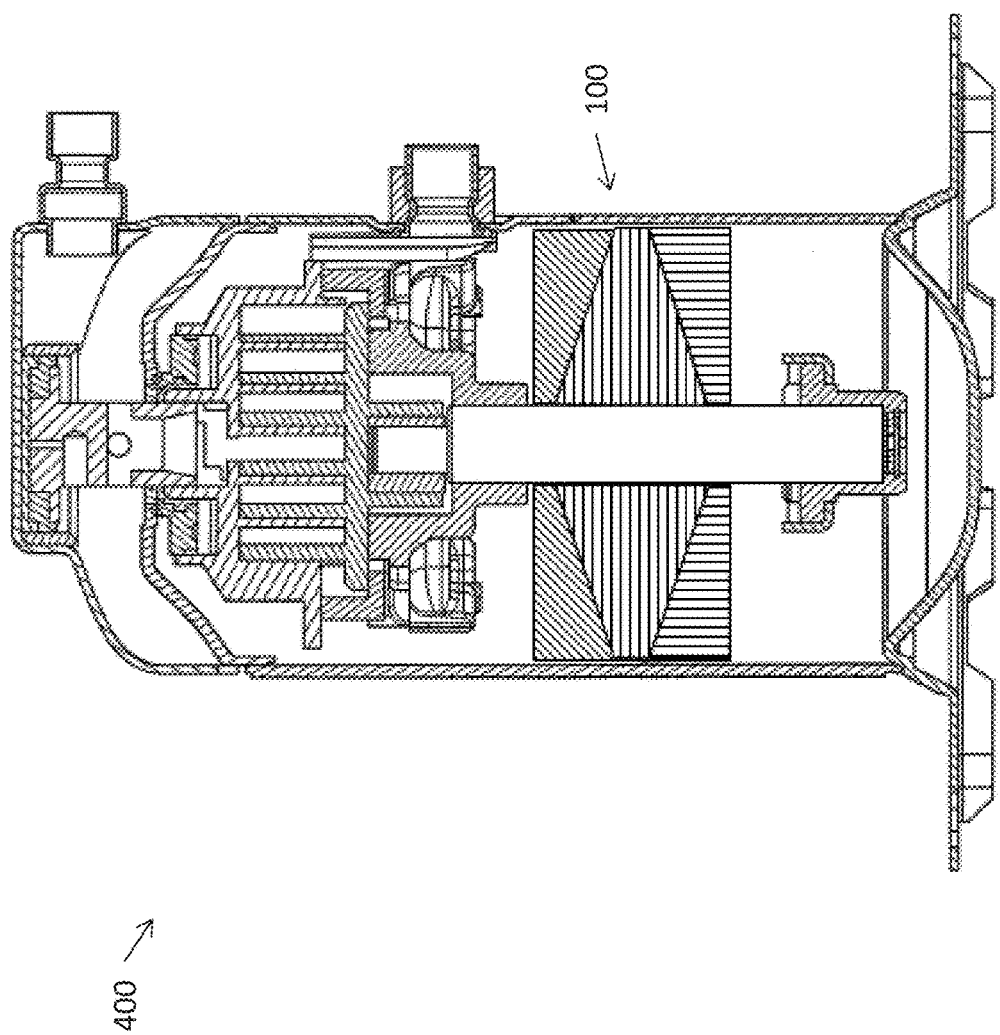
FIG. 4 is a side view of a compressor including the stator assembly of FIG. 1 according to another example embodiment.

In some embodiments, the stator assembly 100 may be assembled into a compressor. For example, FIG. 4 illustrates a compressor 400 including the stator assembly 100 of FIG. 1. The compressor 400 may include any suitable motor components, including a rotor, etc. In some embodiments, the compressor 400 may be a variable speed compressor. In such examples, the variable speed compressor may be a scroll compressor. In other embodiments, the compressor 400 may be another suitable compressor.

According to another example embodiment, a method of winding a stator assembly for a three phase dynamoelectric machine is disclosed. The method may be implemented with any example stator assemblies described herein, or with other stator assemblies, and may form the winding pattern 300 described herein or any other suitable winding patterns.

The example method includes winding a wire around three consecutive teeth to define a first coil portion about a first of the three consecutive teeth, to define a second coil portion about a second of the three consecutive teeth, to define a third coil portion about a third of the three consecutive teeth, to define a first connection portion extending between the first coil portion and the second coil portion to electrically couple the first coil portion and the second coil portion, and to define a second connection portion extending between the second coil portion and the third coil portion to electrically couple the second coil portion and the third coil portion. The first coil portion, the second coil portion, the third coil portion, the first connection portion, and the second connection portion are defined by a continuous length of wire having two ends.

Winding the wire may include winding the wire around the first of the three consecutive ones of the plurality of teeth to form the first coil portion, routing the wire from the first coil portion to the second coil portion to form the first connection portion, winding the wire around the second of the three consecutive ones of the plurality of teeth to form the second coil portion, routing the wire from the second coil portion to the third coil portion to form the second connection portion, and winding the wire around the third of the three consecutive ones of the plurality of teeth to form the third coil portion.

The method may also include winding a second wire around a second set of three consecutive teeth to define three different coil portions about respective ones of the second set of consecutive teeth and to define connection portions between said three different coil portions of the second set of consecutive teeth. The three different coil portions and the connection portions of the second set of consecutive teeth are defined by a second continuous length of wire having two ends.

The method may further include winding a third wire around a third set of three consecutive teeth to define three different coil portions about respective ones of the third set of consecutive teeth and to define connection portions between said three different coil portions of the third set of consecutive teeth. The three different coil portions and the connection portions of the third set of consecutive teeth are defined by a third continuous length of wire having two ends.

Winding the wire around the teeth may include routing the wire between coil portions in a delta connection winding pattern to define lead portions of the winding wire positioned in one of a first, second or third lead bundle for coupling to a first phase, a second phase, or a third phase, respectively, of a three phase electric power source. For example, the wire may be wound to form a delta connection winding pattern in which each coil portion corresponds to one of the three phases of the dynamoelectric machine. When routing the wire from one coil portion to another, a lead portion may be defined (e.g., by routing the wire out of the stator core and back into the stator core, etc.). Each lead portion may be routed to form a lead bundle with other lead portions that correspond to the same phase of the electric power source.

The example method may be implemented using a winding machine to automatically wind the wire about the multiple teeth of the stator core. For example, a winding machine may use a single needle to thread, guide, route, etc. a continuous length of winding wire around the multiple teeth, and from one tooth to another tooth. The winding machine may wind the wire in a delta winding pattern with lead portions that extend out of the stator core for coupling to different phases of a three phase electric power source. The winding machine may route the wire from one tooth to another via an end cap, and may separate connection portions into respective routing paths of the end cap based on different phases of connection portions.

The winding machine may move the single needle vertically and move the stator assembly horizontally to wind the wire about the multiple teeth of the stator assembly. Other embodiments may move the needle and stator assembly in other suitable directions.

The winding machine may be any suitable machine configured to wire stator assemblies. The winding machine may be a three needle winding machine. For example, the winding machine may use three needles to wind three separate single continuous lengths of winding wire about respective sets of consecutive teeth of a stator assembly. For example, three wires may be wound substantially simultaneously to reduce the operation time of the winding machine. A first wire may be wound about a first set of three consecutive teeth at the same time a second wire is being wound about a second set of three consecutive teeth and a third wire is being wound about a third set of three consecutive teeth. In some embodiments, the winding machine may move the three needles in a circle around the stator, while keeping the stator stationary.

This may allow for faster operation of the winding machine. In some embodiments, the winding machine may be able to wind the stator assembly in approximately five minutes or less. The winding machine may balance a location to the three needles to allow for higher winding revolutions per minute. For example, the three winding needles may be spaced apart by approximately equal distances (e.g., by about 120 degrees each) to balance the winding needles.

A lead wire may be pulled out before the tooth is wound by the machine so that the lead wire is secured to the tooth by the tooth winding. After the machine winding process is completed, a user may hand group the lead wires into three lead wire bundles.

The example method may also include assembling the stator assembly into a compressor after winding the wire around the plurality of teeth. Once the stator assembly is wound, the stator assembly may be assembled into a compressor, which may include assembling the stator assembly with other suitable compressor components, a rotor, etc.

The winding machine may use any suitable winding pattern for winding the stator assembly. For example, FIG. 3 illustrates an example winding pattern in which a method of winding the wire may include routing a first continuous length of wire through a slot between the first tooth and the ninth tooth to form a lead portion, winding the wire about the first tooth, routing the wire over to the second tooth, routing the wire through a slot between the first tooth and the second tooth twice to form another lead portion, winding the wire about the second tooth, routing the wire over to the third tooth, routing the wire through a slot between the second tooth and the third tooth twice to form another lead portion, winding the wire about the third tooth, and routing the wire through a slot between the third tooth and the fourth tooth to form another lead portion.

The method may further include routing a second continuous length of wire through a slot between the third tooth and the fourth tooth to form another lead portion, winding the wire about the fourth tooth, routing the wire over to the fifth tooth, routing the wire through a slot between the fourth tooth and the fifth tooth twice to form another lead portion, winding the wire about the fifth tooth, routing the wire over to the sixth tooth, routing the wire through a slot between the fifth tooth and the sixth tooth twice to form another lead portion, winding the wire about the sixth tooth, and routing the wire through a slot between the sixth tooth and the seventh tooth to form another lead portion.

The method may also include routing a third continuous length of wire through a slot between the sixth tooth and the seventh tooth to form another lead portion, winding the wire about the seventh tooth, routing the wire over to the eighth tooth, routing the wire through a slot between the seventh tooth and the eighth tooth twice to form another lead portion, winding the wire about the eighth tooth, routing the wire over to the ninth tooth, routing the wire through a slot between the eighth tooth and the ninth tooth twice to form another lead portion, winding the wire about the ninth tooth, and routing the wire through a slot between the ninth tooth and the first tooth to form another lead portion.

Example embodiments described herein may provide one or more advantages, including but not limited to reducing the cycle time of a winding machine to wind teeth of a stator assembly, a balanced needle location for higher winding revolutions per minute, a simpler inter-pole connection, a simpler endcap design, a simpler winding machine design, lead wires secured by a coil, reduced use of wire sleeves, higher quality of a stator, more reliability in winding the stator, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A stator assembly for a three phase dynamoelectric machine, the assembly comprising:
a non-segmented stator core including a stator yoke and a plurality of teeth extending from the stator yoke toward a central opening, the central opening extending from a first end of the stator core to a second end of the stator core opposite the first end, the plurality of teeth spaced apart from one another and defining a plurality of slots between the plurality of teeth for receiving windings of the stator assembly;
a plurality of coil portions electrically coupled in a delta winding pattern, each coil portion extending around a different one of the plurality of teeth and through slots on each side of said different one of the plurality of teeth; and
a plurality of connection portions, each connection portion extending between two adjacent ones of the plurality of coil portions and electrically coupling said two adjacent ones of the plurality of coil portions;
wherein a first set of consecutive ones of the plurality of coil portions and the connection portions coupled therebetween are defined by a first continuous length of winding wire having two wire ends, wherein a second set of consecutive ones of the plurality of coil portions and the connection portions coupled therebetween are defined by a second continuous length of winding wire having two wire ends, and wherein a third set of consecutive ones of the plurality of coil portions and the connection portions coupled therebetween are defined by a third continuous length of winding wire having two wire ends.

2. The stator assembly of claim 1, wherein each set of consecutive ones of the plurality of coil portions includes a first one of the plurality of coil portions corresponding to a first phase of the three phase dynamoelectric machine, a second one of the plurality of coil portions corresponding to a second phase of the three phase dynamoelectric machine, and a third one of the plurality of coil portions corresponding to a third phase of the three phase dynamoelectric machine.

3. The stator assembly of claim 1, wherein the stator assembly includes a total of nine teeth and a total of nine coil portions, each of the coil portions extending about a different one of the nine teeth and through slots on each side of said different one of the nine teeth.

4. The stator assembly of claim 1, wherein adjacent coil portions belong to different ones of the sets of coil portions, with each coil portion adjacent other coil portions corresponding to different phases than said coil portion.

5. The stator assembly of claim 1, wherein each of the plurality of connection portions includes a lead portion, and each lead portion is positioned in one of a first, second or third lead bundle for coupling to a first phase, a second phase, or a third phase, respectively, of a three phase electric power source.

6. The stator assembly of claim 1, further comprising an end cap positioned on the first end of the stator core, wherein the end cap includes a plurality of guides for separating connection portions corresponding to different phases to prevent shorting between the connection portions corresponding to the different phases.

7. The stator assembly of claim 1, wherein all of the plurality of coil portions and all of the plurality of connection portions are defined by no more than three continuous lengths of winding wire.

8. The stator assembly of claim 1, wherein the continuous lengths of winding wire do not include a sleeve covering any of the connection portions.

9. A compressor including the stator assembly of claim 1.

10. The stator assembly of claim 5, wherein all of the lead portions are routed through nine of the plurality of slots.

11. The stator assembly of claim 6, wherein the end cap is a first end cap, the stator assembly further comprising:
a second end cap positioned on the second end of the stator core and configured to route at least one lead portion.

12. A method of winding a stator assembly for a three phase dynamoelectric machine, the stator assembly including a non-segmented stator core having a stator yoke and a plurality of teeth extending from the stator yoke toward a central opening, the central opening extending from a first end of the stator core to a second end of the stator core opposite the first end, the plurality of teeth spaced apart from one another and defining a plurality of slots between the plurality of teeth for receiving windings of the stator assembly, the method comprising:
winding a wire around three consecutive ones of the plurality of teeth to define a first coil portion about a first of the three consecutive ones of the plurality of teeth, to define a second coil portion about a second of the three consecutive ones of the plurality of teeth, to define a third coil portion about a third of the three consecutive ones of the plurality of teeth, to define a first connection portion extending between the first coil portion and the second coil portion to electrically couple the first coil portion and the second coil portion, and to define a second connection portion extending between the second coil portion and the third coil portion to electrically couple the second coil portion and the third coil portion;
wherein the first coil portion, the second coil portion, the third coil portion, the first connection portion, and the second connection portion are defined by a continuous length of wire having two wire ends.

13. The method of claim 12, wherein winding the wire includes:
winding the wire around the first of the three consecutive ones of the plurality of teeth to form the first coil portion;
routing the wire from the first coil portion to the second coil portion to form the first connection portion;
winding the wire around the second of the three consecutive ones of the plurality of teeth to form the second coil portion;
routing the wire from the second coil portion to the third coil portion to form the second connection portion; and
winding the wire around the third of the three consecutive ones of the plurality of teeth to form the third coil portion.

14. The method of claim 12, wherein the three consecutive ones of the plurality of teeth are a first set of consecutive ones of the plurality of teeth and the continuous length of wire is a first continuous length of wire, the method further comprising:
winding a second wire around a second set of three consecutive ones of the plurality of teeth to define three different coil portions about respective ones of the second set of consecutive teeth and to define connection portions between said three different coil portions of the second set of consecutive teeth, wherein the three different coil portions and the connection portions of the second set of consecutive teeth are defined by a second continuous length of wire having two ends; and
winding a third wire around a third set of three consecutive ones of the plurality of teeth to define three different coil portions about respective ones of the third set of consecutive teeth and to define connection portions between said three different coil portions of the third set of consecutive teeth, wherein the three different coil portions and the connection portions of the third set of consecutive teeth are defined by a third continuous length of wire having two ends.

15. The method of claim 14, wherein winding the first wire, winding the second wire, and winding the third wire are performed at the same time.

16. The method of claim 13, wherein winding the wire includes routing the wire between coil portions in a delta connection winding pattern such that each coil portion corresponds to one of three phases of the dynamoelectric machine.

17. The method of claim 12, wherein winding includes winding the wire using a winding machine to automatically wind the wire around the plurality of teeth and route the connection portions.

18. The method of claim 17, wherein winding includes winding the wire around all the teeth using three winding needles.

19. The method of claim 18, wherein winding includes using the three winding needles to wind the wire substantially simultaneously.

20. The method of claim 12, further comprising:
assembling the stator assembly into a compressor after winding the wire.

21. The method of claim 14, wherein:
the stator assembly incudes a first end cap positioned at a first one of the ends of the stator assembly and a second end cap positioned at a second one of the ends of the stator assembly;
the second tooth of each set of consecutive ones of the plurality of teeth is positioned between the first tooth and the third tooth of said set of consecutive teeth, the third tooth of the first set of consecutive teeth is positioned next to the first tooth of the second set of consecutive teeth, the third tooth of the second set of consecutive teeth is positioned next to the first tooth of the third set of consecutive teeth, and the third tooth of the third set of consecutive teeth is positioned next to the first tooth of the first set of consecutive teeth;
winding the wire around the first set of consecutive teeth includes routing the wire from the first end of the stator assembly to the second end of the stator assembly through a slot between the third tooth of the third set of consecutive teeth and the first tooth of the first set of consecutive teeth to form a lead portion belonging to a first lead bundle, prior to winding the wire around the first tooth of the first set of consecutive teeth;
routing the wire from the first coil portion to the second coil portion of the first set of consecutive teeth includes routing the wire along the second end cap to the second tooth of the first set of consecutive teeth, and routing the wire through the slot between the first tooth and the second tooth of the first set of adjacent teeth twice to form another lead portion belonging to a second lead bundle, prior to winding the wire around the second tooth of the first set of consecutive teeth;
routing the wire from the second coil portion to the third coil portion of the first set of consecutive teeth includes routing the wire along the second end cap to the third tooth of the first set of consecutive teeth, and routing the wire through the slot between the second tooth and the third tooth of the first set of consecutive teeth twice to form another lead portion belonging to a third lead bundle, prior to winding the wire around the third tooth of the first set of consecutive teeth;

winding the wire around the third tooth of the first set of consecutive teeth includes routing the wire through a slot between the third tooth of the first set of consecutive teeth and the first tooth of the second set of consecutive teeth to form another lead portion belonging to the first lead bundle;

winding the second wire around the second set of consecutive teeth includes routing the second wire from the first end of the stator assembly to the second end of the stator assembly through a slot between the third tooth of the first set of consecutive teeth and the first tooth of the second set of consecutive teeth to form another lead portion belonging to the first lead bundle, winding the second wire around the first tooth of the second set of consecutive teeth, routing the second wire along the second end cap to the second tooth of the second set of consecutive teeth, routing the second wire through the slot between the first tooth and the second tooth of the second set of consecutive teeth twice to form another lead portion belonging to the second lead bundle, winding the second wire around the second tooth of the second set of consecutive teeth, routing the second wire along the second end cap to the third tooth of the second set of consecutive teeth, routing the second wire through the slot between the second tooth and the third tooth of the second set of consecutive teeth twice to form another lead portion belonging to the third lead bundle, winding the second wire around the third tooth of the second set of consecutive teeth, and routing the second wire through a slot between the third tooth of the second set of consecutive teeth and the first tooth of the third set of consecutive teeth to form another lead portion belonging to the first lead bundle; and winding the third wire around the third set of consecutive teeth includes routing the third wire from the first end of the stator assembly to the second end of the stator assembly through a slot between the third tooth of the second set of consecutive teeth and the first tooth of the third set of consecutive teeth to form another lead portion belonging to the first lead bundle, winding the third wire around the first tooth of the third set of consecutive teeth, routing the third wire along the second end cap to the second tooth of the third set of consecutive teeth, routing the third wire through the slot between the first tooth and the second tooth of the third set of consecutive teeth twice to form another lead portion belonging to the second lead bundle, winding the third wire around the second tooth of the third set of consecutive teeth, routing the third wire along the second end cap to the third tooth of the third set of consecutive teeth, routing the third wire through the slot between the second tooth and the third tooth of the third set of consecutive teeth twice to form another lead portion belonging to the third lead bundle, winding the third wire around the third tooth of the third set of consecutive teeth, and routing the third wire through a slot between the third tooth of the third set of consecutive teeth and the first tooth of the first set of consecutive teeth to form another lead portion belonging to the first lead bundle.

22. The method of claim 12, wherein routing each connection portion includes routing a lead portion out of one of the plurality of slots.

* * * * *